(12) United States Patent
Ohnishi et al.

(10) Patent No.: US 6,400,255 B1
(45) Date of Patent: Jun. 4, 2002

(54) VEHICLE LOCK APPARATUS

(75) Inventors: Noriyasu Ohnishi, Nishikasugai-gun; Yoshihiro Fukuta, Toyota; Keiji Yamamoto, Okazaki, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/155,712

(22) PCT Filed: Mar. 31, 1997

(86) PCT No.: PCT/JP97/01116

§ 371 (c)(1),
(2), (4) Date: May 24, 1999

(87) PCT Pub. No.: WO97/37096

PCT Pub. Date: Oct. 9, 1997

(30) Foreign Application Priority Data

Apr. 3, 1996 (JP) ............................................. 8-081496

(51) Int. Cl.⁷ ................................................ G06F 7/04
(52) U.S. Cl. ................... 340/5.62; 340/10.1; 340/5.61; 343/712; 307/10.3
(58) Field of Search ............................... 307/10.5, 10.3; 343/712, 713, 711; 340/5.62, 5.64, 5.72, 10.1, 10.4, 10.5

(56) References Cited

U.S. PATENT DOCUMENTS

| | | | |
|---|---|---|---|
| 3,703,714 A | 11/1972 | Andrews | 350/224 |
| 5,146,215 A | 9/1992 | Drori | 340/825.32 |
| 5,252,965 A | * 10/1993 | Gidwani et al. | 340/825.56 |
| 5,345,247 A | * 9/1994 | Aldama et al. | 343/791 |
| 5,808,372 A | 9/1998 | Schwegler et al. | 307/10.3 |

FOREIGN PATENT DOCUMENTS

| | | |
|---|---|---|
| JP | 60-70460 | 5/1985 |
| JP | 62-203854 | 9/1987 |
| JP | 62-283705 | 12/1987 |
| JP | 63-13847 | 2/1988 |
| JP | 63-63875 | 3/1988 |
| JP | 63-107669 | 5/1988 |
| JP | 2-161085 | 6/1990 |
| JP | 4-98974 | 8/1992 |
| JP | 7-38503 | 7/1995 |
| JP | 7-205759 | 8/1995 |
| JP | 7-324533 | 12/1995 |
| JP | 8-86130 | 4/1996 |
| JP | 9-105255 | 4/1997 |

OTHER PUBLICATIONS

Ralph Mcelroy Translation Company, Security System, May, 2001, PTO 01–2181–translation from JP07324533.*

* cited by examiner

Primary Examiner—Michael Horabik
Assistant Examiner—M Shimizu
(74) Attorney, Agent, or Firm—Pillsbury Winthrop LLP

(57) ABSTRACT

A vehicle lock apparatus in which a wireless door lock function and an immobilizing function are established is provided. A key (26) is provided with a battery (30), a switch (32) and a control IC (28). An antenna-coil 12 is mounted at an end portion of a key cylinder (10). A wireless antenna (20) is mounted at a predetermined position in a vehicle. When the switch (32) is turned on, a wireless signal is transmitted by the control IC (28) so that the wireless door lock function is established. When the key (26) is inserted in the key cylinder (10), the control IC (28) inhibits the transmission of the wireless signal and communicates with the antenna-coil (12) using an ID code so that the immobilizing function is established,

12 Claims, 13 Drawing Sheets

VEHICLE LOCK APPARATUS

This application is the national phase of international application PCT/JP97/01116 filed Mar. 31, 1997 which designated the U.S.

1. Field of the Invention

The present invention relates to a vehicle lock apparatus, and more particularly to a vehicle lock apparatus having a wireless door lock system remotely controlling a look mechanism of a vehicle and an immobilizer switching a state of a vehicle between a state in which the vehicle can start and a state in which the vehicle can not start.

2. Background of the Invention

Conventionally, a technique by which a wireless door look apparatus and an anti-theft system are combined has been known, as indicated, for example, in Japanese Laid-Open Patent Application No. 2-161085. In the above conventional apparatus, the wireless door lock apparatus has a wireless transmission unit provided in a key, a door lock mechanism provided in a vehicle and a warning unit issuing a warning under a predetermined condition.

The wireless sending unit uses a battery provided in the key as a power supply. When a sending switch is operated, the wireless sending unit sends a wireless signal including a predetermined ID signal. The door lock mechanism provided in the vehicle locks and unlocks the door when the ID signal included in the wireless signal is equal to an ID signal assigned to the vehicle. The warning until its switched from an active state to an inactive state when the door is unlocked in response to the wireless signal. In addition, the warning unit in switched from the inactive state to the, active state when the door is locked.

As has been described above, according to the above apparatus, based on a function of the wireless door lock apparatus, the lock state of the door and the state of the warning unit can be remotely controlled. Thus, according to the conventional apparatus, the state of the warning unit can be securely and pertinently switched without reducing the facility.

An apparatus disclosed for example, in Japanese Laid-Open Patent Application No. 63-63875 has been conventionally known as an apparatus electrically forming a function of a key in the same manner as the wireless door lock apparatus. The above conventional apparatus has a transponder provided in a key and an antenna-coil provided near a key cylinder. The transponder is provided with a coil forming an electromagnetic coupling circuit in conjunction with the antenna-coil when the key is inserted into the key cylinder and a rectifier circuit connected to the coil.

An AC voltage having a predetermined frequency is applied between both ends of the antenna-coil. When the AC voltage is applied between both ends of the antenna-coil, an AC voltage in generated in the coil of the transponder by electromagnetic induction. The AC voltage generated between both ends of the coil is converted into a DC voltage by the rectifier circuit. The transponder uses the DC voltage generated as described above as a power supply and sands an electromagnetic in signal inducting a predetermined ID signal.

The electromagnetic signal sent by the transponder ie received by the antenna-coil. The conventional apparatus has a demodulation circuit demodulating the electromagnetic signal received by the antenna-coil and an unlock mechanism unlocking a lock when the ID signal included in the demodulated signal is equal to an ID signal assigned to a vehicle. Thus, according to the above conventional apparatus, the lock can be unlocked only when the proper key is inserted into the key.

In the wireless door lock apparatus and the lock apparatus using the transponder as described above, it is determined whether the ID signal sent from the key is equal to an ID signal assigned to the vehicle. If the ID code of the key is equal to the ID code of the vehicle, a computer used to control an engine, is controlled to be in an active state. If the ID codes are not equal to each other, the computer is controlled to be in an inactive state. Due to the above control of the computer, the active/inactive state of the vehicle can be controlled based on the above determination result. As has been described above, the sending of the ID signal using the wireless signal or the electromagnetic signal as a medium is effective for the control of the lock state of the vehicle and for the control of the active/inactive state of the vehicle.

However, in a case where the ID signal is sent using the wireless signal, although there is an advantage in that a relatively long communication distance can be secured, there is a disadvantage in that a large amount of electric power is needed to send the wireless signal, so that communication can not be performed using energy of a power supply from the vehicle side. Thus, in a cage where the active/inactive state of the vehicle is controlled using the wireless signal, if the battery provided in the key has been consumed, the inactive state of the vehicle can not be removed in spite of using the proper key.

In a case where the ID signal is sent using the electromagnetic signal transmitted by the transponder, although there is an advantage in that communication can be performed using energy of a power supply from the vehicle side, there is a disadvantage in that only a very short communication distance ie secured. Thus, a function for remotely controlling the door look may not be formed according to a constitution for sending the ID signal using the electromagnetic signal.

Thus, in order to secure superior facility regarding lock and unlock operations of the door and electrically control the active/inactive state of the vehicle, both a system for controlling the door lock based on the ID signal transmitted using the wireless signal as me medium and a system for controlling the active/inactive state of the vehicle based on the ID signal transmitted using the electromagnetic signal as the medium are needed. In other words, in the vehicle lock apparatus due to coexistence of both systems, the superior facility and the anti-theft function can be compatible.

However, if the wireless signal and the electromagnetic signal are simultaneously sent, the wireless signal and the electromagnetic signal interfere with each other. If the two signals used as the medium sending the ID signal interfere with each other, the ID signal may not be transmitted from the key to the vehicle. Thus, in the apparatus in which both the system for transmitting the ID signal using the wireless signal as the medium and the system for transmitting the ID signal using the electromagnetic signal as the medium merely coexist with each other, an operation failure may occur.

SUMMARY OF THE INVENTION

In view of the above point, an object of the present invention is to provide a vehicle lock apparatus having superior facility and a superior anti-theft function, in which apparatus a proper operation state can always be maintained.

A vehicle, lock apparatus to achieve the above object of the present invention has a wireless door look function for remotely controlling a locked/unlocked state of a vehicle and an immobilizer function for switching a state of the vehicle between an active state and an inactive state. In addition, the vehicle lock apparatus comprises a portable transmitting unit for transmitting a first code signal set in accordance with a first method and a second code signal set in accordance with a second method. The vehicle lock apparatus further comprises a wireless door lock unit for switching the locked/unlocked state of the vehicle when the first code signal corresponds to a vehicle code and an immobilizer unit for switching the state of the vehicle from the inactive state to the active state when the second code signal corresponds to the vehicle code, wherein the wireless door lock unit or the immobilizer unit is selectively activated.

In the present invention, the wireless door lock function is established by transmitting the first code signal from the portable transmitting unit. In addition, the immobilizing function is established by transmitting the second code signal from the portable transmitting unit. In a case where the code signal used to establish the wireless door lock function and the code signal used to establish the immobilizing function differ from each other, a high security can be obtained further, in the present invention, the wireless door lock function and the immobilizing function are selectively established. Thus, an operation failure based on the interference between the first code signal and the second code signal is avoided. Thus, according to the present invention, the operation failure in avoided, the superior facility is obtained, and the superior anti-theft function can be established.

Another vehicle lock apparatus to achieve the above object has a wireless door lock function for remotely controlling a locked/unlocked state of a vehicle and an immobilizing function for switching a state of a vehicle between an active state and an inactive state, in addition, the vehicle lock apparatus comprises a portable transmitting unit for transmitting a first code signal set in accordance with a first method and a second code signal set in accordance with a second method and having an internal power supply for supplying a power used to transmit the first code signal. The vehicle lock apparatus further comprises an immobilizing power generating unit for generating a power used to transmit the second code signal when the portable transmitting unit is in a predetermined close state with respect to the vehicle, a wireless door lock unit for switching the looked/unlocked state of the vehicle when the first code signal corresponds to a vehicle code, an immobilizer unit for switching the state of the vehicle from the inactive state to the active state when the second code signal corresponds to the vehicle code, and a wireless inhibiting unit for inhibiting the portable transmitting unit from transmitting the first code signal when the immobilizing power generating unit generates a predetermined power. A communication length for the first code is set at a sufficiently large value.

In the present invention, trio portable transmitting unit is provided with the internal power supply used to transmit the first code signal. Thus, the first code signal can be transmitted under a condition in which the portable transmitting unit is sufficiently away from the vehicle. In addition, the communication length for the first code signal, is long enough. Thus, the wireless door lock function can be established even if the vehicle and the portable transmitting unit are away from each other.

On the other hand, the second coda signal is only transmitted under a condition in which the immobilizing power generating unit can generate a power, that is, a condition in which the vehicle and the portable transmitting unit are in the predetermined close state. Thus, when the vehicle and the portable transmitting unit are away from each other, the first code signal and the second code signal are not simultaneously transmitted from the portable transmitting unit. Thus, the two signals do not interfere with each other. Further, under a condition in which the vehicle and the portable transmitting unit are in the predetermined close state and the immobilizing power generating unit generates a power, the transmission of the first code signal is inhibited. Thus, even it the vehicle and the portable transmitting unit are in the predetermined close state, the interference between the first code signal and the second code signal does not occur. As has been described above, according to the present invention, while avoiding the interference between the first code signal and the second code signal, the wireless door lock function and the immobilizing function can be established in stability.

DESCRIPTION OF THE PREFERRED EMBODIMENT

Figure 1:
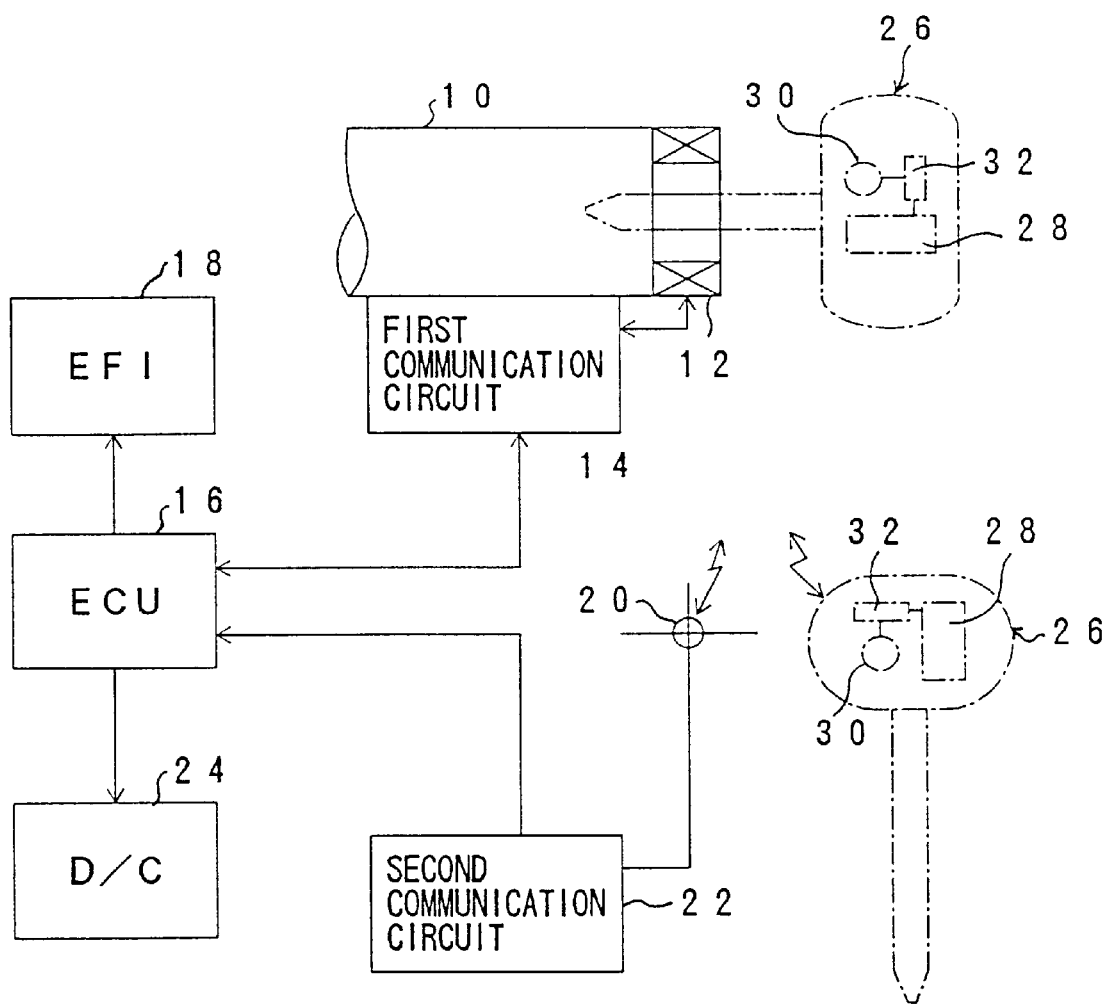
FIG. 1 is system constitution diagram illustrating a vehicle look apparatus according to an embodiment of the present invention.

FIG. 1 indicates a System constitution of a vehicle look apparatus according to an embodiment of the present invention. The system according to the present embodiment has a key cylinder 10. An end (a right end shown in FIG. 1) of the key cylinder 10 is provided with an antenna-coil 12. In addition, a first communication circuit 14 is provided near the key cylinder 10. The antenna-coil 12 is electrically connected to the first communication circuit 14.

The first communication circuit 14 is connected to an electronic control unit 16 (hereinafter, referred to as an ECU 16) for controlling the vehicle lock apparatus. Further, the ECU 16 is connected with a computer 18 (hereinafter, referred to as an EFI computer 18) for control of an engine. The ECU 16 controls the EFI computer to be in an active state or au inactive state based on a signal transmitted by the communication circuit 14.

The vehicle lock apparatus according to the present embodiment has a wireless antenna 20. The wireless antenna 20 is electrically connected to a second communication circuit 22. In addition, the second communication circuit 22 is connected to the ECU 16. The second communication circuit 22 amplifies a wireless signal received by the wireless antenna 20 and supplies it to the ECU 16.

The ECU 16 is connected with a door control computer 24 (hereinafter, referred to as a D/C computer 24) for controlling a door lock state. The ECU 16 sends a control signal to the D/C computer 24 based on a signal transmitted by the second communication circuit 22. The D/C computer 24 receives the control signal sent by the ECU 16 and looks and unlocks a door lock.

The vehicle lock apparatus according to the present embodiment has a key 25. The key 26 is provided with a control IC 28, a battery 30 and a switch 32. In the present embodiment, doors and a trunk are switched between a locked state and an unlocked state by an operation of the switch 32. The number of the switch 32 provided in the key is not limited to one. A switch for locking the doors, a switch for unlocking the doors and a switch for locking and unlocking the trunk may be separately provided in the key 26.

The control IC 28, is provided with a coil which forms an electromagnetic circuit in conjunction with the antenna-coil 12 when the key 28 is inserted into the key cylinder 10. In addition the control IC 28 has a function by which an electromagnetic signal is sent from the coil provided therein to the antenna-coil 12.

Figure 2:
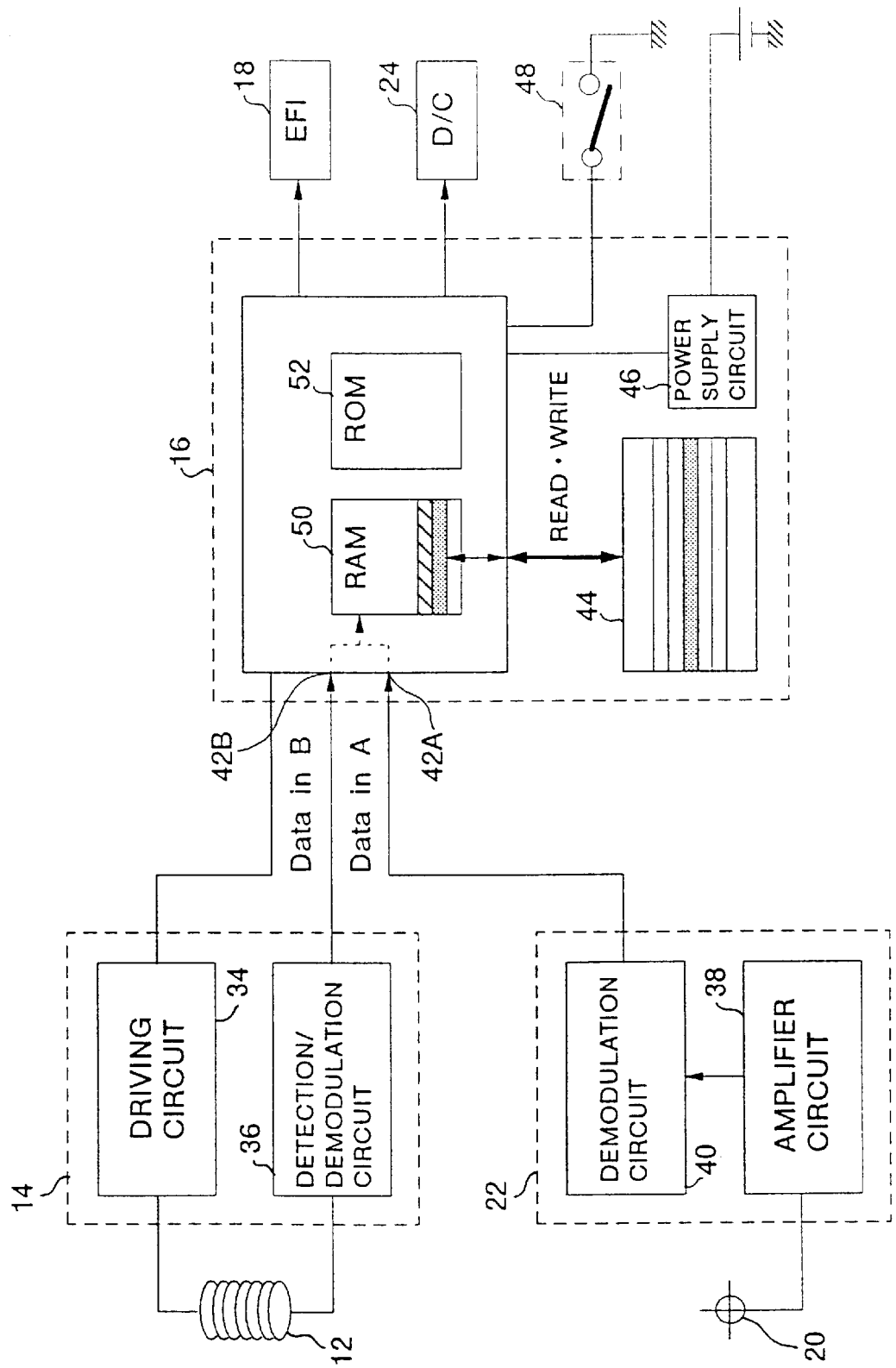
FIG. 2 it a block diagram illustrating a first communication circuit, a second communication circuit and an electronic control unit all of which are provided in the vehicle lock apparatus shown in FIG. 1.

FIG. 2 shows a block diagram of internal structures of the first communication circuit 14, the second communication circuit 22 and the ECU 16. The first communication circuit 14 has a driving circuit 34 connected to the antenna-coil 12 and a detection/demodulation circuit 36. The driving circuit 34 receives a driving signal when the ECU 16 outputs the driving signal, as will be described later, and generates an AC voltage having a predetermined frequency. When the driving circuit 34 generates the AC voltage as described above, a voltage signal varying at the predetermined frequency of the AC voltage is generated between both ends or the antenna-coil 12.

The voltage signal generated between both ends of the antenna-coil 12 is input to the detection/demodulation circuit 36. As has been described above, the control IC 28 provided in the key 20 serially transmits a determination code formed of a plurality of binary signals. When the above determination code is transmitted by the control IC 28, an amplitude modulation signal or a frequency modulation signal is generated between both ends of the antenna-coil 12. The detection/demodulation circuit 36 demodulates such a modulation signal and generates binary signals corresponding to respective bit values of the determination code transmitted from the key 20.

The second communication circuit 22 has a amplifier circuit 38 connected to the wireless antenna 20 and a demodulation circuit 40. The amplifier circuit 38 amplifies the wireless signal received by the wireless antenna 20 and supplies it to the demodulation circuit 40. The control IC 28 provided in the key 20 transmits, in accordance with, for example, an FM modulation transmission method, the wireless signal on which the determination code is superposed. The demodulation circuit 40 demodulates the signal supplied from the amplifier circuit 38 and generates a signal corresponding to the determination code superposed on the wireless signal.

The ECU 16 has a micro-computer 42, an EEPROM 44 and a power-supply circuit 46. The EEPROM 44 is an erasable non-volatile memory element which can maintain memory contents even it a power supply is interrupted and rewrite the memory contents by supplying predetermined electric signals. In the present embodiment, five types of ID codes, each formed a plurality of bit signals, are stored in the EEPROM 44. The number of types of ID codes is not limited to five. The number of types of ID codes may be greater or less than five.

The power-supply circuit 46 supplies a power to the micro-computer 42. The power-supply circuit 46 is supplied with a power supply voltage from a battery of a vehicle. The power-supply circuit 46 uses the power supply voltage and outputs a voltage of 5 volts. The five types of ID codes stored in the EEPROM 44 correspond to five keys capable of being used for a vehicle.

The micro-computer 42 ie connected with the EFI computer 18, the D/C computer 24 and a key switch 48. The key switch 48 is in an on-state when the key 26 is inserted in the key cylinder 10. An end of the key switch 48 is connected to a GND terminal. The micro-computer 42 determines that the key 26 is inserted in the key cylinder 10 when the GND potential is supplied from the key 48.

The micro-computer 42 has a RAM 50 which is a volatile memory and a ROM 52 which is a read-only memory. In addition, the micro-computer 42 has a data-in-B terminal 423 connected to the detection/demodulation circuit 36 of the first communication circuit 14 and a data-in-A terminal 42A connected to the demodulation circuit 40 of the second communication circuit 22. The micro-computer 42 recognizes a determination code supplied to the data-in-A terminal 42A as a code supplied by using the wireless signal as the medium and a determination code supplied to the data in B terminal 42B as a code supplied by using the electromagnetic signal as the medium.

In the micro-computer 42, the code recognized as a code supplied by using the wireless signal as the medium is converted in accordance with a first converting logic and then stored in the RAM 50. When the determination code stored as described above is equal to one of the ID codes stored in the EEPROM 44, the micro-computer 42 supplies a signal to reverse the lock state of the door lock to the D/C computer 24.

In the micro-computer 42, the code recognized as a code supplied by using the electromagnetic signal as the medium is converted in accordance with a second converting logic and then stored in the RAM 50. When the determination code stored as described above is equal to one of the ID codes stored in the EEPROM 44, the micro-computer 42 outputs a signal to switch the EFI computer 18 from the inactive state to the active state. In a case where the EFI computer 18 is in the inactive state, the ignition is not turned on and the fuel injection is inhibited. When the signal to allow the EFI computer 18 to be in the active state is supplied to the EFI computer 18, the forbidding is cancelled so that the vehicle can start.

Figure 3:
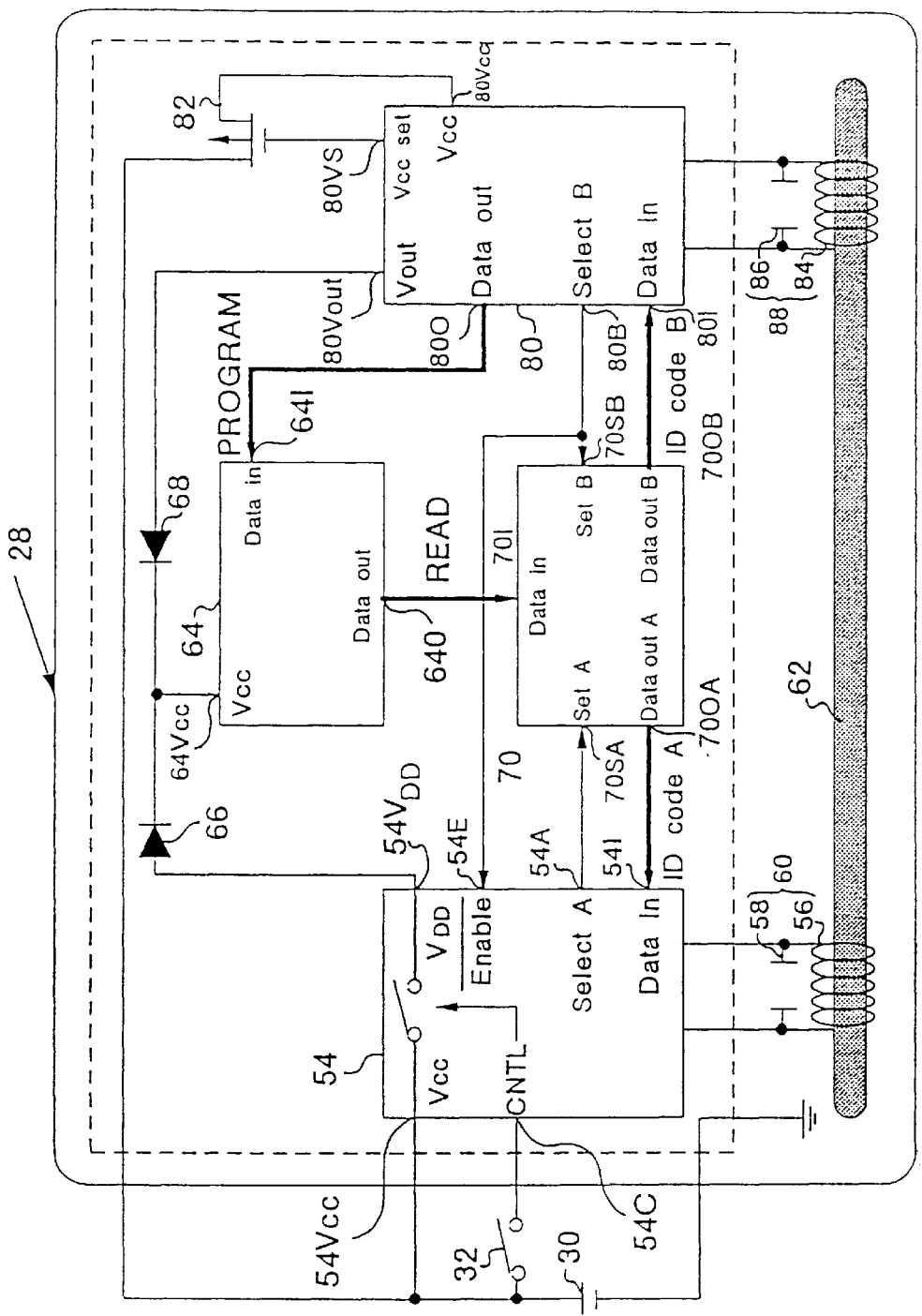
FIG. 3 is circuit diagram illustrating a circuit comprising a control IC, a battery and a switch.

A description will now be given, with reference to FIG. 3, of an internal structure of the key 26. FIG. 3 shows an electric circuit including the control IC 28 provided in the key 26, the battery 30 and switch 32. The control IC 28 has a wireless control unit 54. A power supply terminal 54 Vcc of the wireless control unit 54 is connected with the battery 30. The wireless control unit 54 is activated after the switch 32 is turned on and the power supply-voltage starts to be supplied from the battery 30 to a CNTL terminal 54C.

The wireless control unit 54 has an active-state control terminal 54E. When a low-level signal (hereinafter, referred to as a low signal) is supplied to the active state control terminal 54E, the wireless control unit 54 is in the active state. On the other hand, when a high-level signal (hereinafter, referred to an a high signal) is supplied to the active-state control terminal 54E, the wireless control unit 54 is in the inactive state.

The wireless control unit 54 has a Select-A terminal 54A and a Data-in terminal 54I. The wireless control unit 54 is connected with an LC circuit 60 formed of a wireless antenna-coil 56 and a wireless capacitor 58. In the wireless control unit 54, the power supply voltage is supplied from the battery 30 to the CNTL terminal 54C. When the low signal is supplied to the active-state control terminal 54E, ① a high, signal is output from the Select-A terminal 54A, ② a signal supplied to the Data-in terminal 54I is read and ③ a signal modulated based on the signal read from the Data-in terminal 54I is supplied to the LC circuit 60.

As will b e described later, the Data-in terminal 54I is supplied with the signal including a code (hereinafter, referred to as on A-conversion code) obtained by converting the ID code assigned to the key 26 in accordance with a predetermined rule. Thus, a signal modulated based on the A-conversion code is supplied to the LC circuit 60. The wireless antenna-coil 56 included in the LC circuit 60 is wound on a common antenna core 62. When the signal modulated as described above is supplied to the LC circuit 60, the common antenna core 62 emits the wireless signal including information of the A-conversion code under a directivity corresponding to an axis direction of the common antenna core 62.

The wireless signal emitted by the common antenna core 62 is received by the wireless antenna 20 existing in an area within a predetermined communication distance. The signal received by the wireless antenna 20 is supplied to the micro-computer 42 after being demodulated in the second communication circuit 22 as described above. After this, the micro-computer 42 carries out a process for locking and unlocking the door lock based on the A-conversion code.

The control IC 28 has an EEPROM 64 which is a non-volatile memory. The EEPROM 64 has a power supply terminal 64Vcc, a Data-in terminal 64I and a Data-out terminal 64O. The power supply terminal 64Vcc of the EEPROM 64 is connected with a cathode terminal of a diode 66 and a cathode terminal of a diode 68. The diode 66 is connected to a power supply terminal $54V_{DD}$ of the wireless control unit 54 at the anode terminal thereof. The power supply terminal 54 $V_{DD}$ outputs the power supply voltage Vcc when the voltage 16 supplied from the battery 30 to the CNTL terminal 54C. In addition, the Data-in terminal 64I of the EEPROM 64 is connected to a Date-out terminal 80O of an immobilizing control unit 80 which will be described later.

The EEPROM 64 stores one of the five types of ID codes stored in the EEPROM 44 of the ECU 16. A now ID code is supplied from the immobilizing control unit 80 to the Data-in terminal 64I, and an ID code stored in the EEPROM 64 Is changed to the new ID code.

When the switch 32 is turned on and the power is supplied to the power supply terminal 64Vcc, the EEPROM 64 outputs an ID code stored therein from the Data-out terminal 64O. The output timing of the ID code from the EEPROM 64 is not necessarily synchronized with the on-timing of the switch 32. The wireless control unit 54 outputs a trigger signal, and the output timing of the ID code from the EEPROM 64 may be synchronized with the trigger signal.

The Data-out terminal 64O or the EEPROM 64 is connected to a Data-in terminal 70I of an operation unit 70. In addition, the operation unit 70 has a Set-A terminal 70SA, a Set-B terminal 70SB, a Data-out-A terminal 70OA and a Data-out-B terminal 70OB. The Set-A terminal 70SA and the Data-out-A terminal 70OA are respectively connected to the Select-A terminal 54A of the wireless control unit 54 and the Data-in terminal 54I thereof. The Set-B terminal 70SB and the Data-out-B terminal 70OB are respectively connected to a Select-B terminal 80B of the immobilizing control unit 80 which will be described later and a Data-in terminal 80I thereof.

Figure 4:
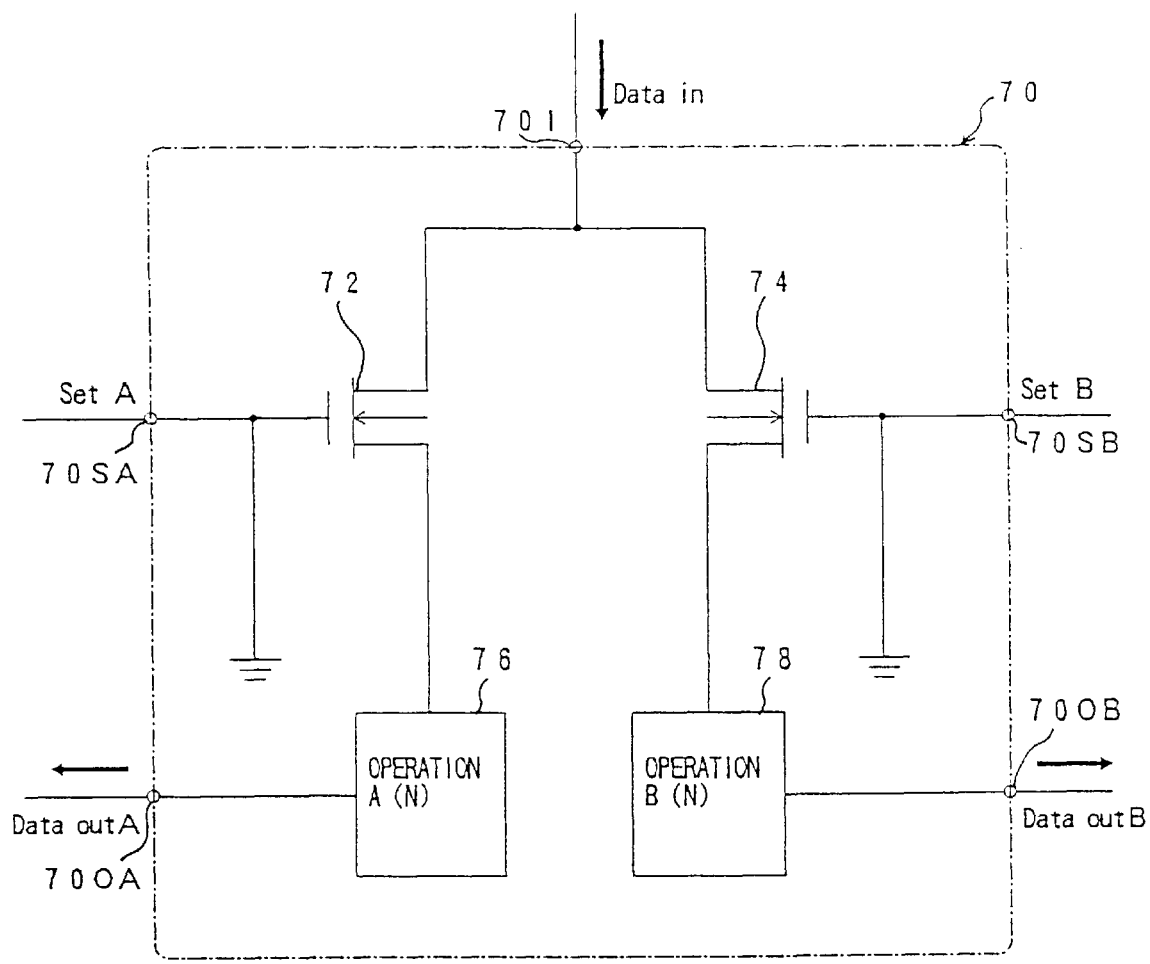
FIG. 4 is a circuit diagram illustrating an internal structure of an operation unit provided in the control IC shown in FIG. 3.

FIG. 4 is a circuit diagram indicating an internal structure or the operation unit 70. As shown in FIG. 4, the operation unit 70 has N-channel MOS transistors 72 and 74. In the present embodiment, the transistors provided in the operation unit 70 are unipolar transistors. However, bipolar transistors may be substituted for the unipolar transistors.

Drain terminals of the transistors 72 and 74 are connected to the Data-in terminal 70I. Gate terminals of the transistors 72 and 71 are respectively connected to the Set-A terminal 70SA and the Set-B terminal 70SB. Source terminals of the transistors 72 and 74 are respectively connected to a first operation circuit 76 and a second operation circuit 78.

When the low signal is supplied to the Set-A terminal 70SA of the operation unit 70, the transistor 72 is turned off. Thus, in such a case, the Data-in terminal 70I and the operation circuit 76 are in an interrupted state. On the other hand, when the high signal is supplied to the Set-A terminal 70SA of the operation unit 70, the transistor 72 is turned on. Thus, in such a case, the Data-in terminal 70I and the operation circuit 76 are in a connected state. In the same manner as in the above cases, the Data-in terminal 70I and the operation circuit 78 are in the interrupted state when the low signal is supplied to the Set-B terminal 70SB and in the connected state when the high signal is supplied to the Set-B terminal 70SB.

The Data-in terminal 70I of the operation unit 70 is supplied with an ID code from the EEPROM 16. When the ID code supplied to the Data-in terminal 70I is supplied to the first operation circuit 76, the first operation circuit 76 converts the ID code into an A-conversion code in accordance with a first logic (hereinafter, referred to as an A-converting logic). The A-conversion code is output to the Data-out-A terminal 70OA. On the other hand, when the ID code supplied to the Data-in terminal 70I is supplied to the second operation circuit 78, the second operation circuit 78 converts the ID code in accordance with a second logic (hereinafter, referred to as a B-converting logic). The converted code (hereinafter, referred to as a B-conversion code) is output to the Data-out-B terminal 70OB.

As shown in FIG. 3, the control IC 28 has the immobilizing control unit 80. The immobilizing control unit 60 has the Data-out terminal 80O, the Select-B terminal 80B and the Data-in terminal 80I, as described above, and additionally has a power supply terminal 80Vout a power supply state set terminal 80VS and a poser supply terminal 80Vcc. The select-B terminal 80SB is connected to the Set-B terminal 70SB; of the operation unit 70 and the active-state control terminal 54E of the wireless control unit 54. The power supply terminal 80VOut is connected to the anode terminal of the diode 68. In addition the power supply state set terminal 80VS and the power supply terminal 80Vcc are respectively connected to the gate terminal of a P-channel MOS transistor 82 dud the source terminal thereof. The drain terminal of the transistor 82 is connected to the battery 30.

The immobilizing control unit 80 is connected with aft LC circuit 88 comprising an electromagnetic-signal antenna-coil 84 and an electromagnetic-signal capacitor 86. The electromagnetic-signal antenna-coil 84 is wound on the common antenna core 62. The electromagnetic-signal antenna-coil 84 and the common antenna core 62 are arranged so that the electromagnetic-signal antenna-coil 84 and the antenna-coil 12 form an electromagnetic coupling circuit when the key 26 is inserted in the key cylinder 10.

Figure 5:
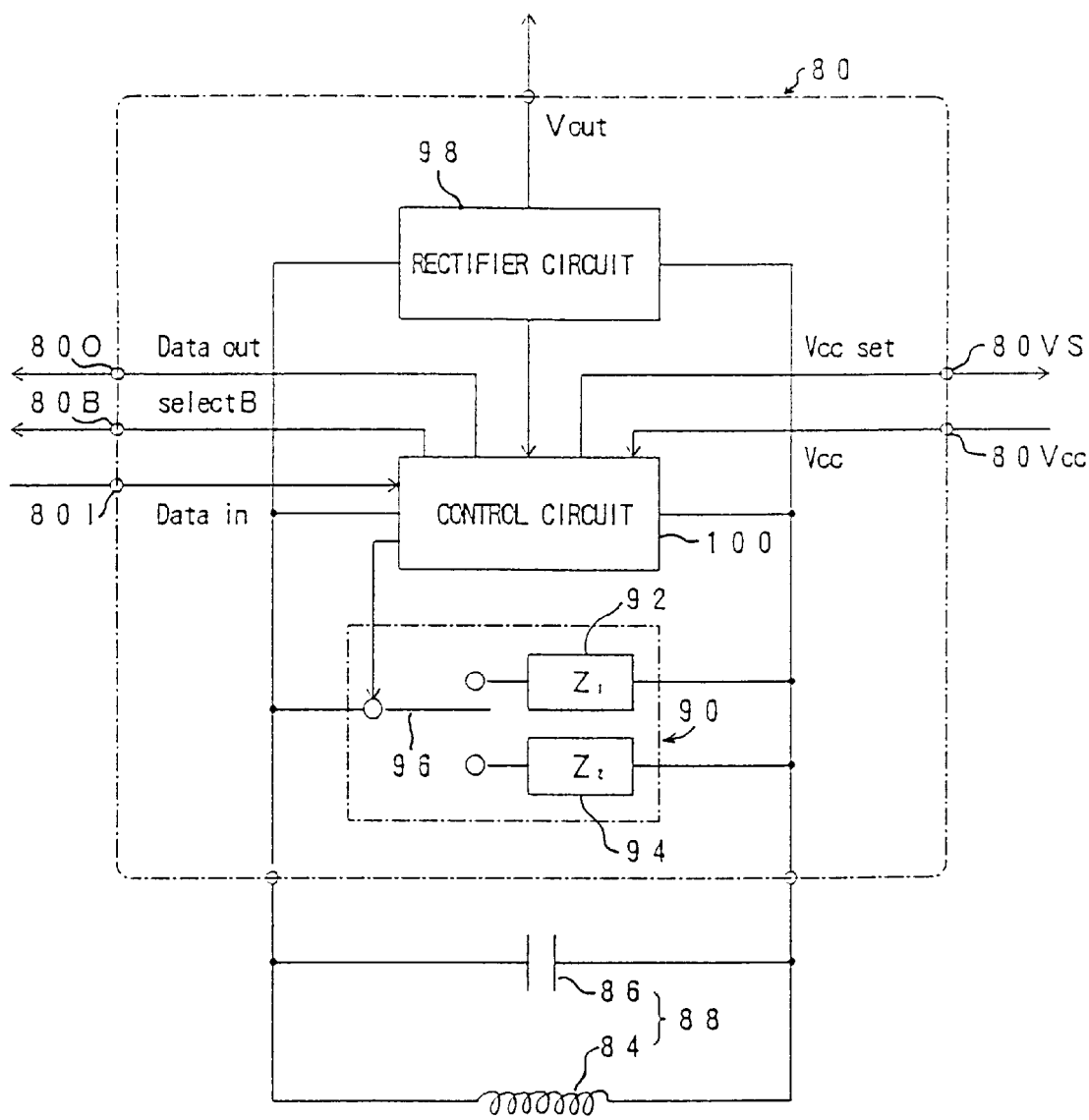
FIG. 5 is a circuit diagram illustrating an internal structure of an immobilizing control unit provided in the control IC.

FIG. 5 is a circuit diagram indicating the internal structure of the immobilizing control unit 80. As shown in FIG. 5, the immobilizing control unit 80 Includes a load circuit 90 connected to the LC circuit 88. The load circuit 90 has a first load 92 including a first impedance Z1, a second load 94 including a second impedance Z2 and a switch circuit 96 which selectively connects the first load or the second load to the LC circuit 88.

In addition, the immobilizing control unit 80 has a rectifier circuit 98 connected to the LC circuit 88. When a voltage signal varying at the predetermined frequency appears between both ends of the antenna-coil 12 in a state where the key 26 is inserted in the key cylinder 10 as shown in FIG. 1, an AC voltage having the same frequency as the voltage signal appearing on the antenna-coil 12 is generated between both ends or the electromagnetic-signal antenna-coil 84 shown in FIG. 5 by the electromagnetic induction action. The rectifier circuit 98 rectifies the AC voltage generated between both ends of the electromagnetic-signal antenna-coil 84 and generates a constant voltage. The constant voltage generated by the rectifier circuit 98 is supplied to the Vout terminal of the immobilizing control unit 80 end a control circuit 100.

The control circuit 100 is an essential part of the immobilizing control unit 80 and is connected to the LC circuit 88, the Data-out terminal 80O, the Select-B terminal 80B, the Data-in terminal 80I, the power supply state set terminal 80VS and the power supply terminal 80Vcc. When the control circuit 100 is supplied With a voltage, greater than a predetermined value, from the rectifier circuit 98, the control circuit 100 determines that the AC voltage is generated between both ends of the electromagnetic signal antenna-coil 84, that is, that the key 26 is inserted in the key cylinder 10. When such a determination result is obtained, the control circuit 100 outputs the high signal to the Select-B terminal 80B.

As shown in FIG. 3, the Select-B terminal 80B at the immobilizing control unit 80 is connected with the active state control terminal 54E of the wireless control unit 54 and the Set-B terminal 70SB of the operation unit 70. Thus, when the high signal is output from the control circuit 100 to the Select-B terminal 80B, the high signal is supplied to both the active state control terminal 54E of the wireless control unit 54 and the Set-B terminal 70SB of the operation unit 70.

When the high signal in supplied to the active-state control terminal 54E, the wireless control unit 54 is in the inactive state. When the wireless control unit 54 is in the inactive state, the output signal from the Select-A terminal 54A of the wireless control unit 54 is maintained as the low signal. Thus, when the control circuit 100 supplies the high signal to the Select-B terminal 80B, that is, when the control circuit 100 determines that the key 26 is inserted in the key cylinder 10, the low signal is supplied to the Set-A terminal 70SA of the operation unit 70 and the high signal is supplied to the Set-B terminal 70SB.

When the low signal is supplied to the Set-A terminal 70SA of the operation unit 70, the transistor 72 shown in FIG. 4 is turned off as described above so that the Data-in terminal 70I and the first operation circuit 76 are in the interrupted state. In addition, when the high signal is supplied to the Set-B terminal 70SB, the transistor 74 shown in FIG. 4 is turned on as described above so that the Data-in terminal 70I and the second operation circuit 78 are in the connected state. Thus, when the key 26 is inserted in the key cylinder 10, the operation unit 70 outputs only the B-conversion code from the Data-out-B terminal 70OB, regardless of the state of the switch 32 (use FIG. 3).

The signal output from the Data-out-B terminal 70OD is supplied to the control circuit 100 shown in FIG. 5 via the Data-in terminal 80I of the immobilizing control unit 80. When the control circuit 100 determines that the key 26 is inserted in the key cylinder 10, the control circuit 100 outputs the high signal to the Select-B terminal 80B and carries out a switching operation of the switch circuit 96 based an the B-conversion code input to the Data-in terminal 80I.

As has been described above, the first load circuit 92 and tie second load circuit 94 respectively include the loads Z1 and Z2 different from each other. Thus, when a state (hereinafter, referred to as a first state) in which the LC circuit 88 is connected with the first load circuit 92 and a state (hereinafter, referred to as a second state) in which the LC circuit 88 is connected with the second load circuit 94 are switched, an oscillating condition of a circuit including the LC circuit 88 is varied. As a result, the AC voltage having an amplitude depending on whether the switch circuit 96 establishes the first state or the second state is generated between both ends of the electromagnetic-signal antenna-coil 84.

The variation of the amplitude of the AC voltage generated between both ends of the electromagnetic-signal antenna-coil 84 affects the voltage signal generated between both ends of the antenna-coil 12 which forms the electromagnetic coupling circuit together with the electromagnetic-signal antenna-coil 84, the antenna-coil 12 being provided at the end of the key cylinder 10. Specifically, when a resonance frequency of a circuit, in the key 26 side, including the LC circuit 88 is equal to the frequency of the AC voltage supplied to the antenna-coil 12, a signal having a relatively large amplitude is generated between both ends of the antenna-coil 12. On the other hand, when the resonance frequency of the circuit in the key 26 side differs from the frequency of the AC voltage supplied between both ends of the antenna-coil 12, a signal having a relatively small amplitude is generated between both ends of the antenna-coil 12.

In the present embodiment, the first load Z1 shown in FIG. 5 is set so that the resonance frequency of the circuit, in the key 26 side, including the LC circuit 88 is substantially equal to the frequency of the AC voltage supplied to the antenna-coil 12 when the first condition is established. In addition, the second load Z2 is set so that the resonance frequency of the circuit, in the key 26 side, including the LC circuit 88 is not equal to the frequency of the AC voltage supplied to the antenna-coil 12 when the second state is established. Thus, according to the system of the present embodiment, the amplitude of the voltage signal generated between both ends of the antenna-coil 12 can be controlled based on whether the switch circuit 96 provided in the immobilizing control unit 80 is connected to the first load 92 or the second load 94.

The control circuit 100 establishes the first state or the second state in accordance with whether a bit value of the signal to be transmitted from the key 26 to the antenna-coil 12 is "1" or "0". As a result, an amplitude depending on the bit value of the signal transmitted from the key 26 appears between both ends of the antenna-coil 12. Hereinafter, a signal used as a medium for information communication between the antenna-coil 12 and the electromagnetic-signal antenna-coil 84 is referred to as an electromagnetic signal.

After the voltage supplied from the rectifier circuit 98 exceeds a predetermined value, the control circuit 100 switches the state of the switch circuit 96 so that ① a series of bit data corresponding to a code indicating a start of data transmission (hereinafter, referred to as a start code), ② a series of bit data corresponding to the B-conversion code supplied from the Data-in terminal 80I and ③ a series of bit data corresponding to a code indicating an end of data transmission (hereinafter, referred to as an end code) are successively supplied to the antenna-coil 12 using the electromagnetic signal as the medium.

The electromagnetic signal transmitted as described above is received by the antenna-coil 12. The detection/demodulation circuit 36 shown in FIG. 2 demodulates the variation of the voltage signal generated between both ends of the antenna-coil 12 to a binary signal and serially transmits the binary signal to the micro-computer 42. Thus, the micro-computer 42 of the ECU 16 is supplied with bit values forming ① the start code, ② the B-conversion code and ③ the end code successively after the key 26 is inserted into the key cylinder 10. After this, the micro-computer 42 carries out a process for releasing or maintaining an operation prohibition state of the vehicle.

As has been described above, the micro-computer 42 applies the first conversion logic to a code which is recognized as a code supplied using the wireless signal as the medium. In addition, the micro-computer 42 applies the second conversion logic to a code which is recognized as a code supplied using the electromagnetic signal as the medium. The switching operation of the locked/unlocked state of the door lock or the active/inactive state of the vehicle is carried out based on whether the converted code is one of the ID codes stored in the EEPROM 44.

In the present embodiment, the A-conversion logic and the B-conversion logic used in the operation unit 70 provided in the key 26 are respectively inverse functions of the first conversion logic and the second conversion logic both of which are used in the micro-computer 42. Thus, the A-conversion code input using the wireless signal as the medium and the B-conversion code input using the electromagnetic signal as the medium are received by the micro-computer 42 and then converted into original codes, that is, the ID codes stored in the EEPROM 64 provided in the key 26 in accordance with the first conversion logic and the second conversion logic. The micro-computer 42 determines whether an ID code restored to an original code is equal to one of the ID codes stored in the EEPROM 44.

When the key 26 is inserted in the key cylinder 10 and the engine is activated, the ECU 16 shown in FIG. 2 carries out, at a predetermined timing, a process for rewriting an ID code, corresponding to the key 26 inserted in the key cylinder 10, out of ID codes stored in the EEPROM 44. In order to rewrite an ID code stored in the EEPROM 44, the ECU 16 supplies a request for rewriting stored data to the control IC provided in the key 26. Specifically, the ECU 16 transmits, in order to rewrite an ID code stored in the EEPROM 44 provided in the ECU 16, a plurality of binary signals forming a new ID code from the antenna-coil 12 to the electromagnetic-signal antenna-coil 84 using the electromagnetic signal as the medium.

The control circuit 100 (see FIG. 5) provided in the key 26 detects, based on the variation of the voltage between both ends of the electromagnetic-signal antenna-coil 84, that the electromagnetic signal is supplied. When detecting the electromagnetic signal, the control circuit 100 supplies the high signal to the power supply state set terminal 80VS of the immobilizing control unit 80.

As shown in FIG. 3, the power supply state set terminal 80VS is connected with the base terminal of the transistor 82. The transistor 82 is turned on when the high signal is output from the power supply state set terminal 80. In addition, when the transistor 82 is in the on state, the power supply terminal Vcc of the immobilizing control unit 80 and the battery 30 are in the connected state. Thus, when the control circuit 100 recognizes the supply of the above electromagnetic signal, the power supply from the battery 30 to the immobilizing control unit 80 starts.

When the electromagnetic signal for the request for rewriting the ID code is supplied, the control circuit 100 (see FIG. 5) of the immobilizing control unit 80 uses the power generated by the rectifier circuit 98 and supplied from the battery 30 and outputs a signal for the request of rewriting the ID code from the Data-out terminal 80O to the EEPROM 64.

A description will now be given of a detailed operation of the vehicle lock apparatus of the present embodiment. When the switch 32 of the key 26 is turned on under a condition in which the key 26 is sufficiently away from the key cylinder 10, the power supply to the wireless control unit 54 and the EEPROM 64 starts. The wireless signal including the A-conversion code is sent from the common antenna core 62.

If there is the wireless antenna 20 in an area within the communication distance of the wireless signal, the wireless signal set by the key 26 is received by the wireless antenna 20. After this, in the ECU 16, the A-conversion code superposed on the wireless signal is converted into an original ID code. If the converted ID code is equal to an ID code stored in the vehicle side, the door lock is locked or unlocked.

As has been described above, according to the vehicle lock apparatus of the present embodiment, due to the operation of the switch 32 of the key 26, the locked/unlocked state of the door lock can be remotely controlled. In addition, when the key 26 is sufficiently away from the key cylinder 10 as has been described above, the transmission and reception of the electromagnetic signal are not carried out between the key 26 and the antenna-coil 12. Thus, when the door lock is remotely operated, the wireless signal and the electromagnetic signal do not interfere with each other. Thus, according to the system of the present embodiment, the wireless door lock function can have high operation stability.

When the key 26 is inserted into the key cylinder 10, the electromagnetic induction action occurs in the electromagnetic signal antenna-coil 84 provided in the key 26. As a result, the power supply from the rectifier control 98 to the immobilizing control unit 80 and the EEPROM 64 starts. The electromagnetic signal including the B-conversion code is then sent from the common antenna core 62 to the antenna-coil 12.

The electromagnetic signal set from the key 26 is received by the antenna-coil 12. The electromagnetic signal is then demodulated to an electric signal having a predetermined format and supplied to the ECU 16. After this, in the ECU 16, the B-conversion code superposed on the electromagnetic signal is converted into an ID code. If the converted ID code is equal to an ID code stored in the vehicle side, the EPI 18 is controlled to switch from the inactive state to the active state.

As has been describe above, according to the door lock apparatus of the present embodiment, due to the insertion of the proper key 26 into the key cylinder 10, the vehicle can be controlled to be in the active state. In addition, the above function can be established without a consumable power supply, such as a battery. Thus, the consumption of the battery does not affect the function which is constantly maintained. Thus, according to the vehicle lock apparatus of the present embodiment, a case where the vehicle can not be in the active state although the proper key 26 is used can be securely avoided.

Further, in the present embodiment, the control IC 28 is formed so that the wireless signal is not sent when the rectifier circuit 98 outputs the proper voltage as described above. Thus, although the switch 32 of the key 26 is turned on when the key 26 is inserted in the key cylinder 10, the wireless signal is not set. Thus, according to the vehicle lock apparatus of the present embodiment, the high stability of the function for switching the vehicle from the inactive state to the active state can be obtained.

In the present embodiment, the wireless antenna-coil 56 and the electromagnetic antenna-coil 84 are would on the common antenna core 62. According to the apparatus of the present embodiment, since the wireless signal and the electromagnetic signal are not simultaneously set, there is no problem in the communication of the ID code using the common antenna core 62 shared by two antenna-coils 56 and 54. Meanwhile, according to the above structure, limiting the increase of the number of parts and cost to the lowermost level, the both of the wireless signal and the electromagnetic signal can be provided with the directivity. Thus, according to the structure of the present embodiment, limiting the increase of the number of parts and cost to the lowermost level, both of the communication using the wireless signal as the medium and the communication using the electromagnetic signal as the medium can have superior communication performance.

As has been described above, in the vehicle lock apparatus of the present embodiment, the wireless signal is superposed with the A-conversion code. On the other hand, the electromagnetic signal is superposed with the B-conversion code. Since two signals are respectively superposed with difference codes as described above, duplicate protection can be applied to a criminal act, such as theft of a vehicle. Meanwhile, these two codes are generated in the key 26 based on the same ID code. The two codes are then restored to the same ID code and processed in the ECU 16. Thus, only one type of ID code stored is sufficient for one key 26. In order to increase the productivity of the key 26 and ECU 16, it is preferable that the number of ID codes to be stored in the EEPROM 64 and 44 be small. From this view point, the vehicle lock apparatus of the present embodiment has an advantage in that a high security is obtained without deterioration of the productivity of the key 26 and ECU 16.

Meanwhile, the ID codes stored in the EEPROM 64 of the key 26 and the EEPROM 44 of the ECU 16 are rewritten at predetermined timings as described above. To rewrite the ID code stored in the EEPROM 64, a relatively large amount of power is needed in comparison with a case where the communication using the electromagnetic signal as the medium is performed. In the control IC 28, when the IC code in the EEPROM 64 is rewritten, the power of the battery 30 is used as described above. Thus, according to the vehicle lock apparatus of the present embodiment, the ID code in the EEPROM 64 can be rewritten with a high accuracy without immoderately increasing the power capacity based on the electromagnetic induction.

Figure 6:
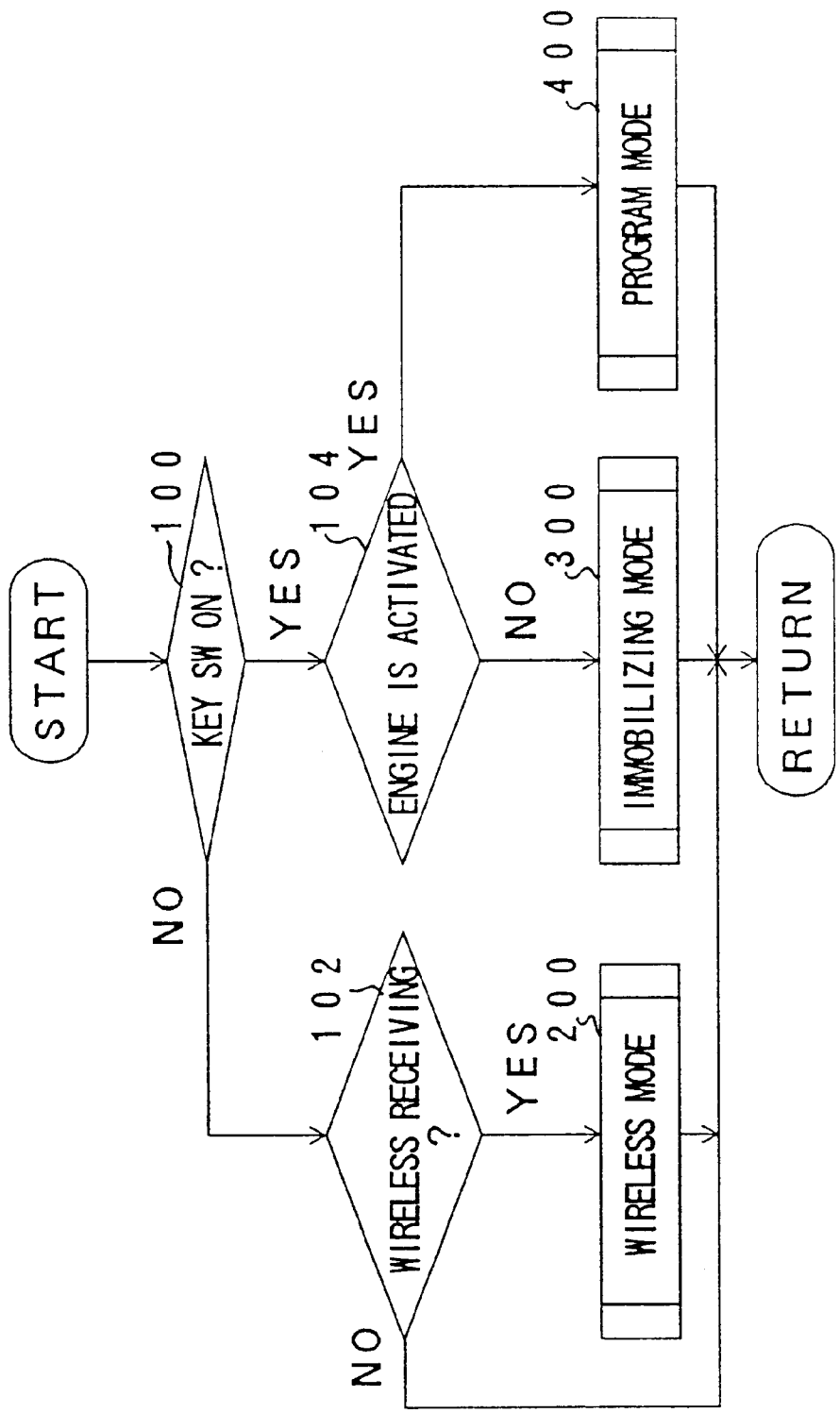
FIG. 6 is a flowchart illustrating an example of a main routine executed by the electronic control unit shown in FIG. 1.

A description will now be given, with reference to FIGS. 6 through 12, of a process executed by the ECU 16 and a process executed in the control IC 28. FIG. 6 shows a flowchart of an example of a main routine executed by the ECU 16. When the routine shown in FIG. 6 is activated, first, it is determined, in step 100, whether the key switch 48 is in the on state, that is, whether the key 26 is inserted in the key cylinder 10.

If it is determined that the key switch 48 is not in the on state, it is then determined, in step 102, whether the wireless signal is received, specifically, whether the demodulated signal is input to the Data-in-A terminal 42A of the microcomputer 42. As a result, if it is determined that the wireless signal is not received, no step is carried out and the present routine is terminated. On the other hand, if it is determined that the wireless signal is received, a subroutine for a wireless mode is activated in step 200 and the present routine is then terminated.

If it is determined, in the above step 100, that the key switch 48 is in the on state, it is determined, in step 104, whether the engine has started. As a result, if it is determined that the engine has not yet started, a subroutine for an immobilizing mode is activated in step 300 and the present routine is then terminated.

Figure 7:
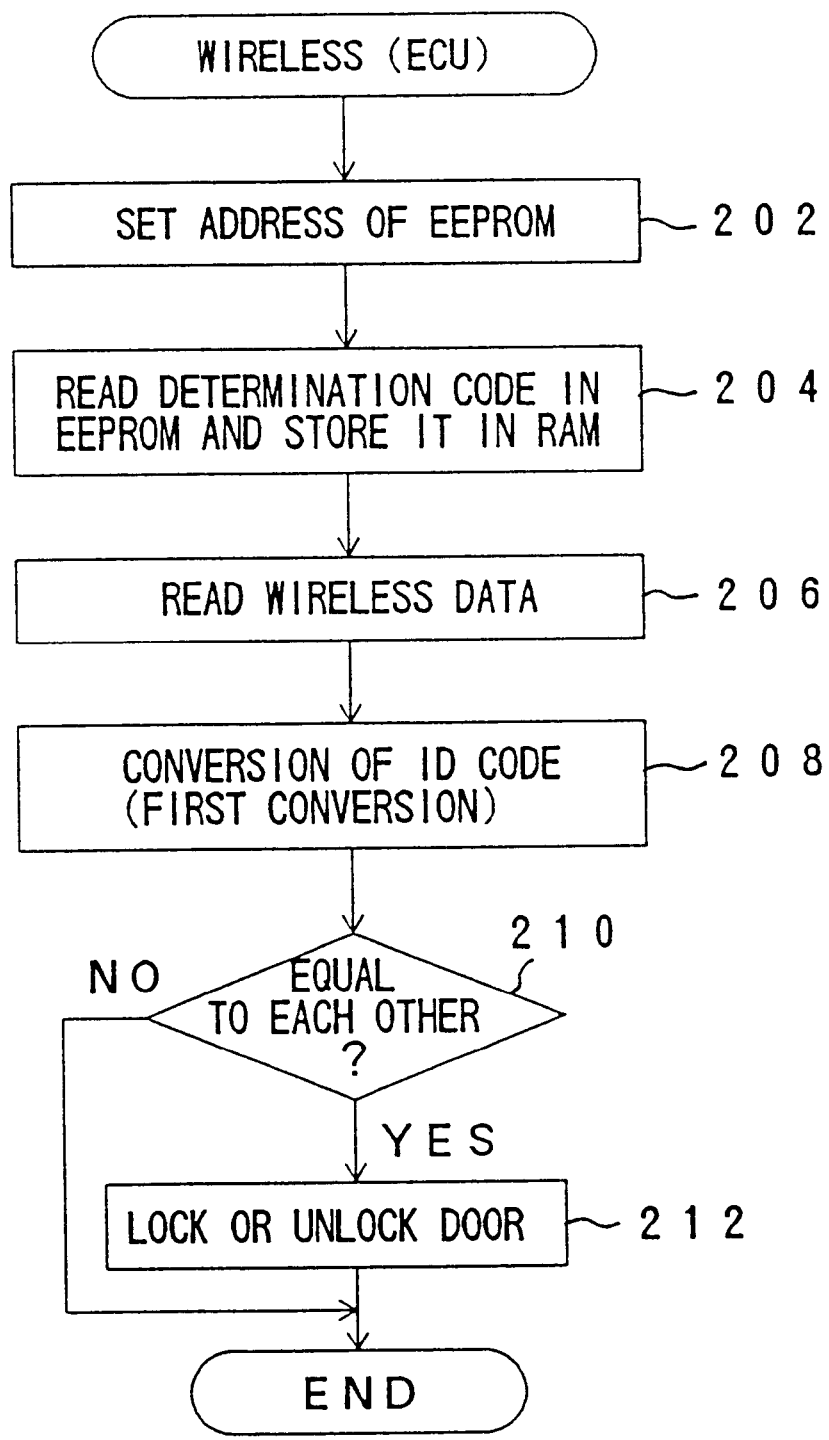
FIG. 7 is a flowchart illustrating an example of a subroutine executed, in a wireless mode, by the electronic control unit shown in FIG. 1.

FIG. 7 shows a flowchart of an example of a subroutine executed in the ECU 16 for the wireless mode. When the routine shown in FIG. 7 is activated, first, an address of the EEPROM 44 is set to be capable of reading out an ID code stored in the EEPROM 44, in step 202. Then, in step 204, a process for reading out an ID code recorded in the EEPROM 44 and storing the code in the RAM 50 is executed.

When the above process is completed, in step 206, a code included in the signal supplied from the wireless signal used as the medium, that is, the A-conversion code is read. In step 208, the first conversion logic is applied to the A-conversion code so that the A-conversion code is converted into the IC code.

When the process for converting the A-code into the ID code is completed, it is then determined, in step 210, whether the converted ID code is equal to the ID code read out of the EEPROM 44. If the converted ID code is equal to none of the ID codes stored in the EEPROM 44, it is recognized that the proper key has been not used. After this, no step is executed and the present routine is terminated. On the other hand, if it is determined, in step 210, that the converted ID code is equal to one of the ID codes read out of the EEPROM 44, an instruction for locking or unlocking the door is sent to the D/C computer 24 and the present routine is terminated.

Figure 8:
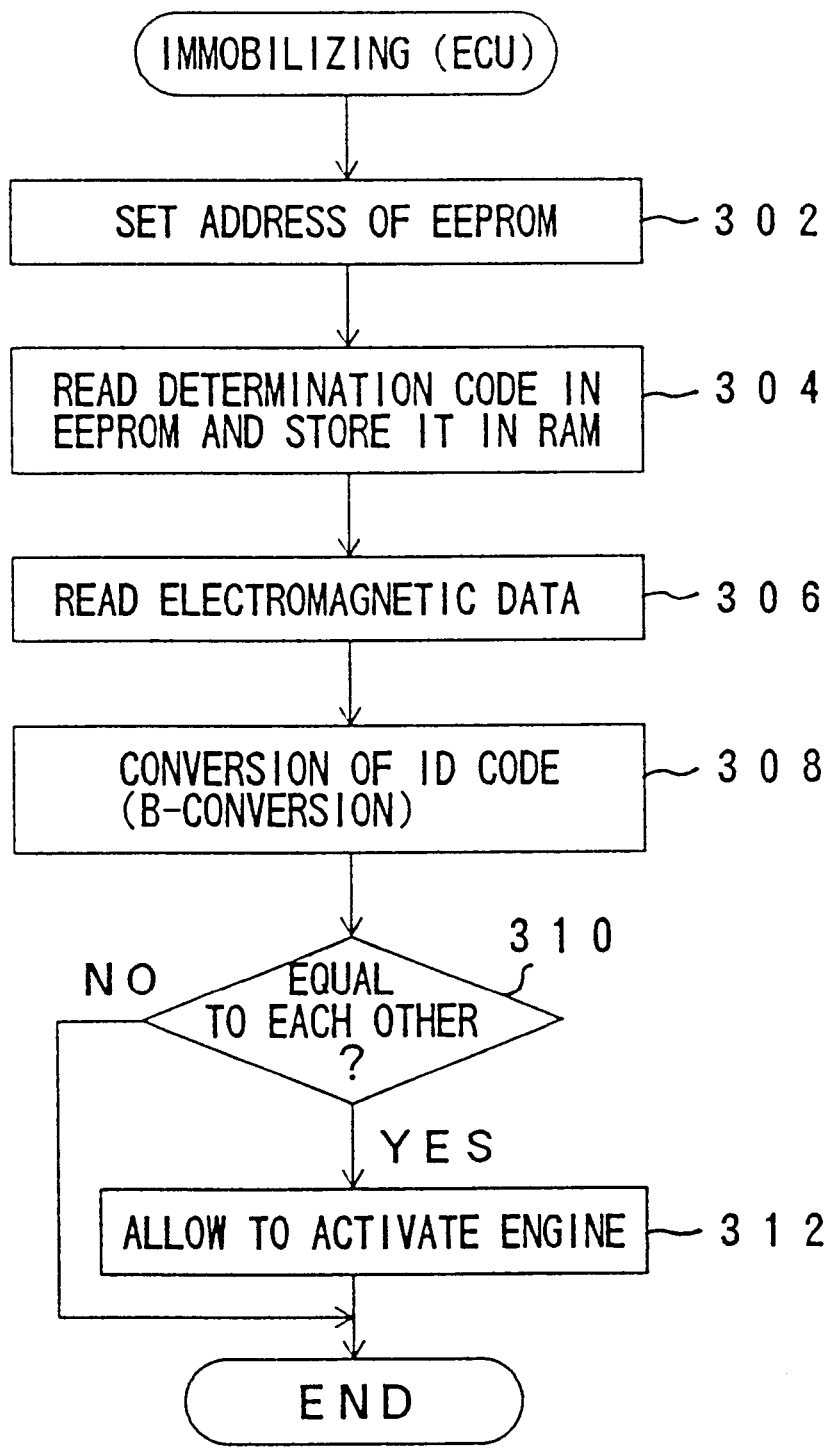
FIG. 8 is a flowchart illustrating an example of a subroutine executed, in an immobilizing mode, by the electronic control unit shown in FIG. 1.

FIG. 8 shows a flowchart of an example of a subroutine executed in the ECU 16 for the immobilizing mode. The immobilizing mode is a mode in which the active/inactive state of the vehicle is controlled based on an ID code transmission to the ECU 16 using the electromagnetic signal as the medium.

When the routine shown in FIG. 8 is activated, first, an address of the EEPROM 44 is set, in step 302, and an ID code stored in the EEPROM 44 is then, in step 304, read and stored in the RAM 50. Next, in step 306, a code included in the signal supplied from the electromagnetic signal used as the medium, that is, the B-conversion code, is read. In step 308, the second conversion logic is applied to the B-conversion code so that the B-conversion code is converted into an ID code.

When the process for converting the B-conversion code into the ID code is completed, it is then determined, in step 310, whether the converted ID code is equal to the ID code read out of the EEPROM 44. If the converted ID code is equal to none of the ID codes stored in the EEPROM 44, it is recognized that the proper key has been not used. After this, any step is not executed and the present routine is terminated. On the other hand, if it is determined, in step 310, that the converted ID code is equal to one of the ID codes read out of the EEPROM 44, an instruction for allowing to switch to the active state is sent to the EPI 18. The present routine is then terminated.

Figure 9:
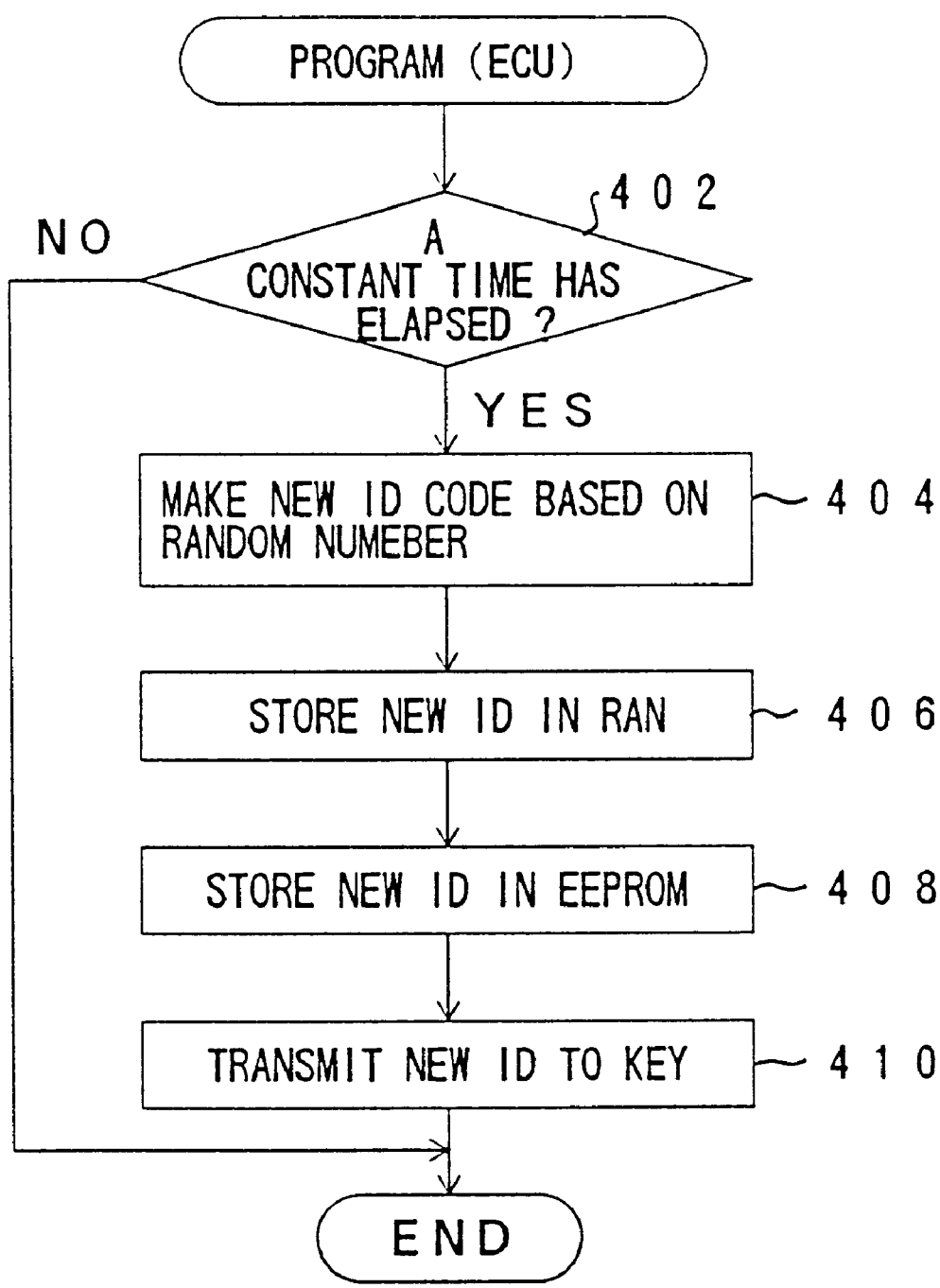
FIG. 9 is a flowchart illustrating an example of a subroutine executed, in a program mode, by the electronic control unit shown in FIG. 1.

FIG. 9 shows a flowchart of an example of a subroutine executed in the ECU 16 for the program mode. The program mode is a mode in which ID stored in the EEPROM 44 and 64 are changed.

When the present routine is activated, it is determined, in step 402, whether a predetermined time period has elapsed. As a result, if the predetermined time period has not yet elapsed, any step is not executed and the present routine is then terminated. On the other hand, if it is determined that the determined time period has elapsed, a process in step 404 is carried out.

In step 404, a new ID code is made of random numbers. After this, the new ID code is stored in the RAM 50 in step 408. The new ID code is recorded in the EEPROM 34 in step 408. Further, the new ID code is transmitted to the key 26 in step 410 and the present routine is then terminated.

Figure 10:
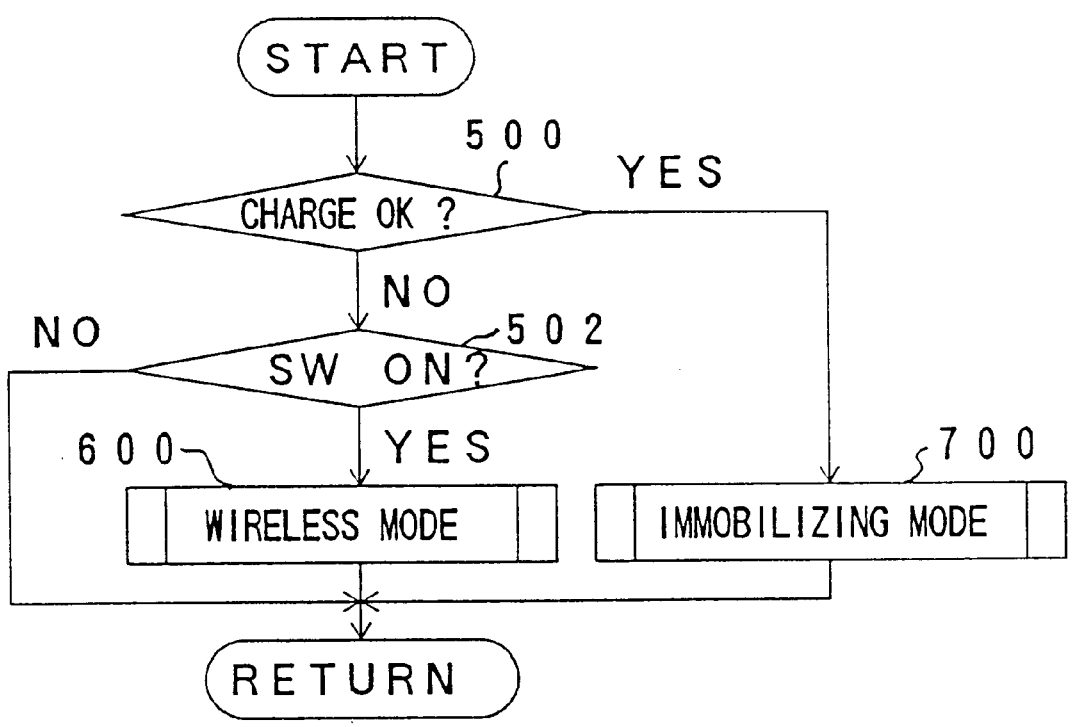
FIG. 10 is a flowchart illustrating an example of a main routine executed in the control IC shown in FIG. 1.

FIG. 10 shows a flowchart of an example of the main routine executed by the control IC 28. When the routine shown in FIG. 10 is activated, first, it is determined, in step 500, whether the rectifier circuit 98 has been sufficiently charged. As a result, if it is determined that the rectifier circuit 98 has not yet been sufficiently charged, it is recognized that the key 26 has not yet been inserted into the key cylinder 10. In this case, it is further determined, in step 502, whether the switch 32 for the wireless transmission is in the on state.

If it is determined that the switch 32 is not in the on state, no step is executed and the present routine is then terminated. On the other hand, if it is determined that the switch 32 is in the on state, a subroutine for the wireless mode is activated in step 600 and the present routine is then terminated.

If it is determined, in step 500, that the rectifier circuit 98 has been sufficiently charged, it is recognized that the key 26 is inserted in the key cylinder 10. In this case, a subroutine for the immobilizing mode is activated in step 700 and the present routine is than terminated.

Figure 11:
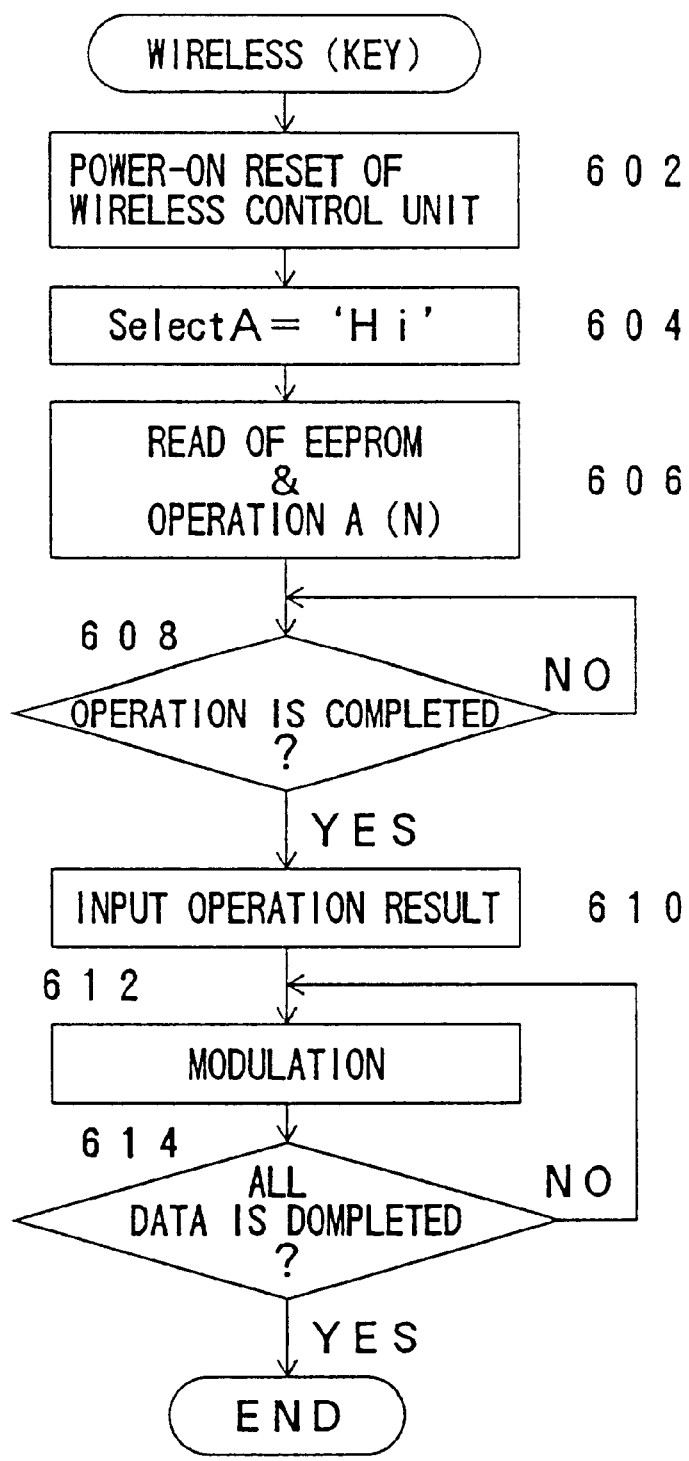
FIG. 11 is a flowchart illustrating an example of a subroutine executed, in the wireless mode, by the control IC shown in FIG. 1.

FIG. 11 shows a flowchart of an example of a subroutine executed by the control IC 28 for the wireless mode. When the routine shown in FIG. 11 activated, the wireless control unit 54 is power-on reset in step 602. The high signal is then output to the Select-A terminal 54A in step 604.

In step 606, an ID code stored in the EEPROM 64 is read out and supplied to the operation unit 70. In the operation unit 70, the ID code is converted into the A-conversion code. It is then determined, in step 608, whether the above conversion process is completed. Until it is determined that the conversion process is completed, the determination process is repeatedly carried out.

If it is determined, in step 608, that the conversion process for converting the ID code into the A-conversion code is completed, the processing result is input to the wireless control unit 54 in step 610. The A-conversion code taken in the wireless control unit 54 is converted into an electric signal, in step 612, in accordance with the frequency modulation method or the amplitude modulation method and supplied to the LC circuit 60. It is then determined, in step 614, whether the transmission of all the data to be transmitted has been completed. If it is determined that the transmission of all the data has been completed, the present routine is terminated.

Figure 12:
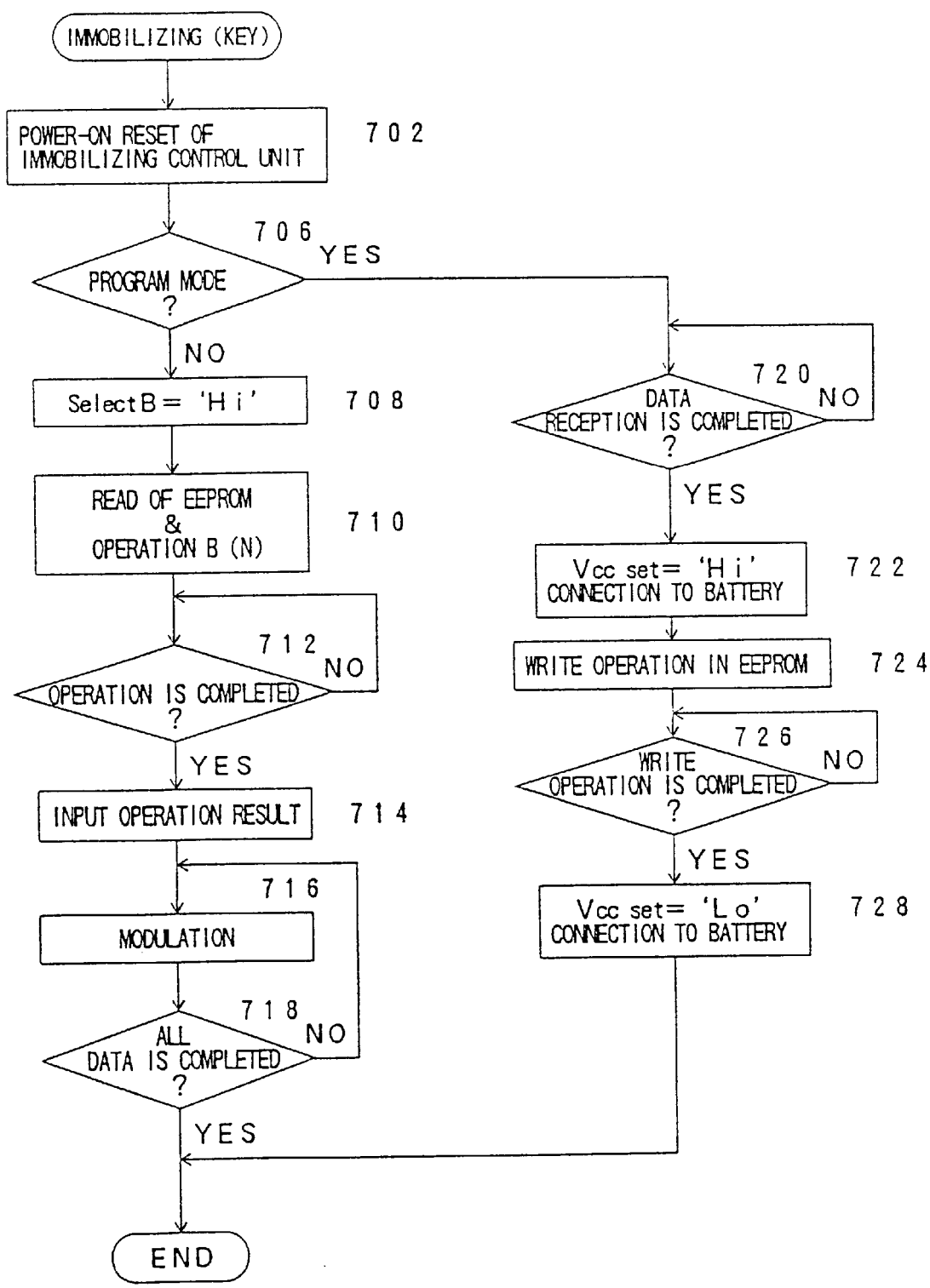
FIG. 12 is a flowchart illustrating an example of a subroutine executed, in the immobilizing mode, by the control IC shown in FIG. 1.

FIG. 12 shows a flowchart of an example of a subroutine executed in the control IC 28 for the immobilizing mode. When the routine shown in FIG. 12 is activated, first, the immobilizing control unit 80 is power-on reset in step 702. It is then determined, in step 706, where the program mode is requested, specifically, where the electromagnetic antenna-coil 84 receives the electromagnetic signal for requesting the rewrite of the ID signal.

If it is determined, in step 706, that the program mode is not requested, the high signal is output at the Select-B terminal 80B in step 708. The ID code stored in the EEPROM 64 is then read out and supplied to the operation unit 70 in step 710. The ID code is then converted into the B-conversion code by the reading unit 70. It is determined, in step 712, whether the operation process is completed. Until the operation process is completed, the determination step is repeatedly carried out.

If it is determined, in step 712, that the conversion process for converting the ID code into the B-conversion code is completed, the operation result is read and supplied to the immobilizing control unit 80 in step 714. The B-conversion code supplied to the immobilizing control unit 80 is converted into an electric signal formed of a plurality of bit signals in step 716, and the electric signal is supplied to the LC circuit 88. It is determined, in step 718, whether the transmission of all the data to be sent is completed. If it is determined that the transmission of all the data to be sent is completed, the present routine is terminated.

If it is determined, in step 706, that the program mode is requested, step 720 and steps after step 720 are executed. It is determined, in step 720, whether all the data needed to rewrite the ID code has been received. The determination process is repeatedly carried out until it is determined that all the data has been completely received.

If it is determined that all the data needed to rewrite the ID code has been completely received, the high signal is output at the power supply state set terminal 80VS in step 722. When the high signal is output from the Vcc set terminal as has been described above, the transistor 82 is turned on and the power supply terminal 80Vcc of the immobilizing control unit 80 is connected to the battery 30.

When the above process is completed, the new IC code is written in the EEPROM 64 in step 724. It is then determined, in step 726, whether the ID code has been completely written in the EEPROM 64. The determination process is repeatedly carried out until it is determined that all the data has been completely written. When it is determined that the new ID code has been completely written, the output of the power supply state set terminal 80VS is switched to the low signal to interrupt the connection between the battery 30 and the power supply terminal 80Vcc in step 728. The present routine is then terminated.

In the above embodiment, by use of the ECU 16, the EFI computer 18 and the D/C computer 24, the immobilizing function and the wireless door lock function are established. However, the constitution of the system to establish the above functions is not limited to the above. A description will now be given, with reference to FIGS. 13 and 14, of another constitution of the system to establish the above functions.

Figure 13:
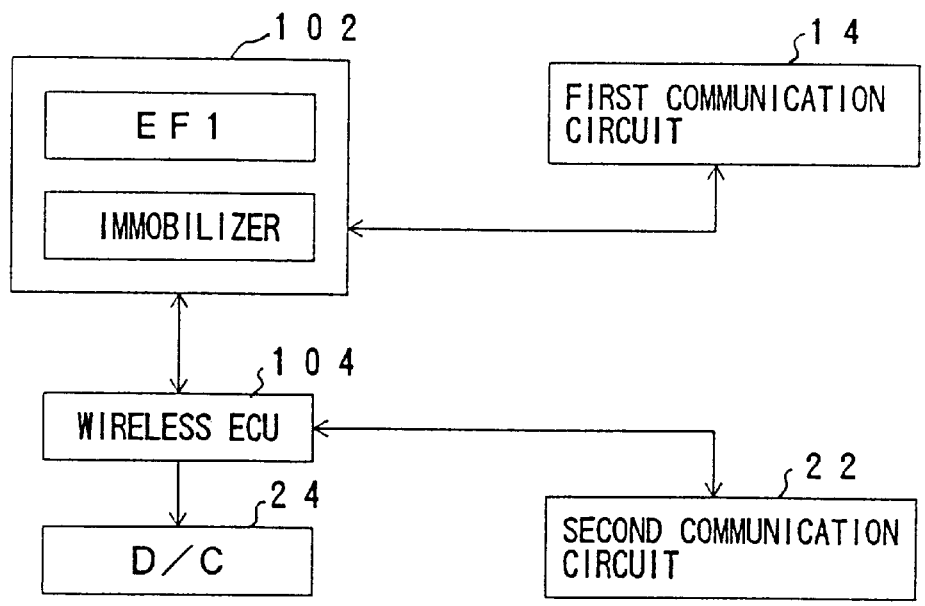
FIG. 13 is a system constitution diagram illustrating an essential part of the vehicle lock apparatus according to a second embodiment of the present invention.

FIG. 13 shows a system constitution diagram of an essential part of the vehicle lock apparatus according to a second embodiment of the present invention. In FIG. 13, those parts which are the same as those shown in FIG. 1 are given the same reference numbers and the description thereof is omitted.

The vehicle lock apparatus according to the present embodiment has the first communication circuit 14, the second communication circuit 22, the D/C computer 24, an ECU 102 for controlling the EFI function and the immobilizing function and a wireless ECU 104 for controlling the wireless door lock function. According to the system constitution of the present embodiment, the immobilizing function and the wireless door lock function can be established in the same manner as in the first embodiment as has been described above.

Figure 14:
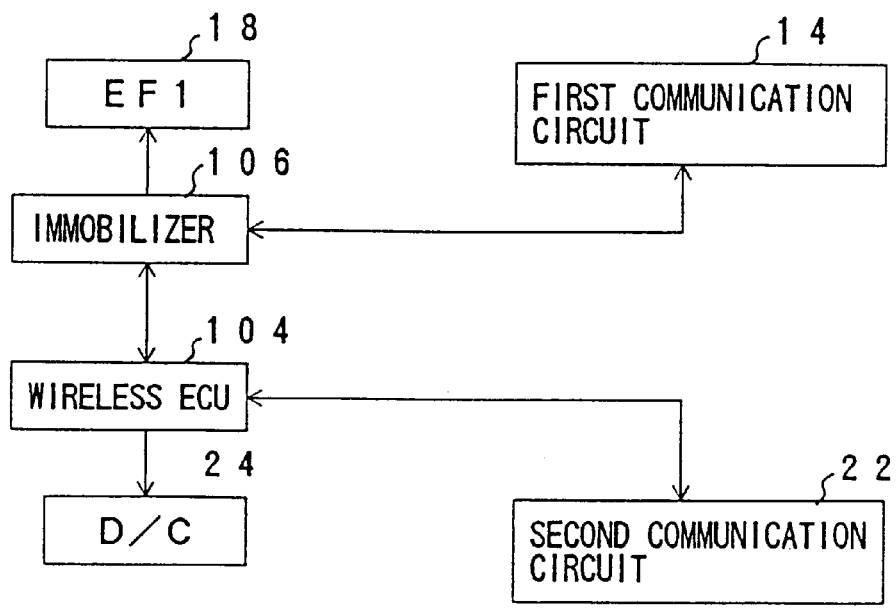
FIG. 14 is a system constitution diagram illustrating an essential part of the vehicle lock apparatus according to a third embodiment of the present invention.

FIG. 14 shows a system constitution diagram of an essential part of the vehicle lock apparatus according to a third embodiment of the present invention. In FIG. 14, those parts which are the same as those shown in FIGS. 1 and 13 are given the same reference numbers and the description thereof is omitted.

The vehicle door apparatus of the present embodiment has the first communication circuit 14, the second communication circuit 22, the EFI computer 18, the D/C computer 24, an ECU 106 for controlling the immobilizing function and the wireless ECU 104. According to the system constitution also, the immobilizing function and the wireless door lock function can be established in the same manner as in the first embodiment.

What is claimed is:

1. A vehicle lock apparatus having a wireless door lock function for remotely controlling a locked/unlocked state of a vehicle and an immobilizing function for switching a state of the vehicle between an active state and an inactive state, said vehicle lock apparatus comprising:

a portable wireless transmitting unit having first code transmitting means for transmitting a first code signal set in accordance with a first method and second code transmitting means for transmitting a second code signal set in accordance with a second method;

wireless door lock means for switching the locked/unlocked state of the vehicle when the first code signal, transmitted by the first code transmitting means, corresponds to a vehicle code;

immobilizing means for switching the state of the vehicle from the inactive state to the active state when the second code signal, transmitted by the second code transmitting means, corresponds to the vehicle code; and the portable wireless transmitting unit including function selecting means for selectively activating one of said wireless door lock means and said immobilizing means, wherein, when one of the wireless door lock function and the immobilizing function is activated by one of the first code signal and the second code signal, the transmission of the other of the first code signal and the second code signal by a corresponding one of the first code transmitting means and the second code transmitting means is inhibited.

2. A vehicle lock apparatus having a wireless door lock function for remotely controlling a locked/unlocked state of a vehicle and an immobilizing function for switching a state of the vehicle between an active state and an inactive state, said vehicle lock apparatus comprising:

a portable transmitting unit having first code transmitting means for transmitting a first code signal set in accordance with a first method, an internal power supply for supplying a power to said first code transmitting means, and second code generating means for transmitting a second code signal set in accordance with a second method;

immobilizing power generating means for supplying a power to said second code generating means when said portable transmitting unit is in a predetermined close state with respect to the vehicle;

wireless door lock means for switching the locked/unlocked state of the vehicle when the first code signal, transmitted by the first code transmitting means, corresponds to a vehicle code;

immobilizer means for switching the state of the vehicle from the inactive state to the active state when the second code signal, transmitted by the second code generating means, corresponds to the vehicle code; and the portable transmitting unit including wireless inhibiting means for inhibiting said first code transmitting means from transmitting the first code signal when said immobilizing power generating means generates a predetermined power, wherein, when the immobilizing function is activated by the second code signal, the wireless inhibiting means inhibits the transmission of the first code signal by the first code transmitting means even if the first code signal is set, and wherein a communication length between said first code transmitting means and said wireless door lock means is longer than a length between the portable transmitting unit and the vehicle when said portable transmitting unit is in the predetermined close state with respect to the vehicle.

3. The vehicle lock apparatus as claimed in either claims 1 or 2, wherein said first code transmitting means has a wireless antenna-coil used to transmit the first code signal, wherein said second transmitting means has an immobilizing antenna-coil used to transmit the second code signal, and wherein said first code transmitting means and said second code transmitting means share a common antenna core on which said wireless antenna-coil and said immobilizing antenna-coil are wound.

4. The vehicle lock apparatus as claimed in claim 2, wherein said portable transmitting unit has code storage means for storing an ID code, first converting means for converting the ID code into the first code signal in accordance with the first method, and second converting means for converting the ID code into the second code signal in accordance with the second method.

5. The vehicle lock apparatus as claimed in claim 4 further comprising:
first restoring means for restoring the first code signal transmitted by said first code transmitting means to the ID code;
second restoring means for restoring the second code signal transmitted by said second code transmitting means to the ID code; and
code determination means for determining whether each of the ID code obtained by said first restoring means and the ID code obtained by said second restoring means is equal to the vehicle code.

6. The vehicle lock apparatus as claimed in claim 5, wherein said code determination means has vehicle code storage means for storing a plurality of vehicle codes, and wherein it is determined whether the restored ID code is one of said plurality of vehicle codes.

7. The vehicle lock apparatus as claimed in claim 5 further comprising:
vehicle code rewriting means for rewriting the vehicle code, wherein said portable transmitting unit has ID code rewriting means for rewriting the ID code so that the ID code is equal to the vehicle code rewritten by said vehicle code rewriting means.

8. The vehicle lock apparatus as claimed in claim 7, wherein said portable transmitting unit has power supply means for causing said internal power supply to supplying a power to said ID code rewriting means when a request for rewriting the ID code takes place.

9. A vehicle lock apparatus having a wireless door lock function for remotely controlling a locked/unlocked state of a vehicle and an immobilizing function for switching a state of the vehicle between an active state and an inactive state, said vehicle lock apparatus comprising:
a portable transmitting unit having first code transmitting means for transmitting a first code signal set in accordance with a first method and second code transmitting means for transmitting a second code signal set in accordance with a second method;
wireless door lock means for switching the locked/unlocked state of the vehicle when the first code signal, transmitted by the first code transmitting means, corresponds to a vehicle code;
immobilizing means for switching the state of the vehicle from the inactive state to the active state when the second code signal, transmitted by the second code transmitting means, corresponds to the vehicle code; and
the portable transmitting unit including function selecting means for selectively activating one of said wireless door lock means and said immobilizing means, wherein, when the first code transmitting means activates the wireless door lock function, the second code transmitting means is inhibited, thereby preventing activation of the immobilizing function, and when the second code transmitting means activates the immobilizing function, the first code transmitting means is transmitted, thereby preventing activation of the wireless door lock function.

10. A vehicle lock apparatus having a wireless door lock function for remotely controlling a locked/unlocked state of a vehicle and an immobilizing function for switching a state of the vehicle between an active state and an inactive state, said vehicle lock apparatus comprising:
a portable transmitting unit having a wireless control unit to transmit a first code signal set in accordance with a first method and an immobilizing control unit to transmit a second code signal set in accordance with a second method;
a door control computer to switch the locked/unlocked state of the vehicle when the first code signal, transmitted by the wireless control unit, corresponds to a vehicle code;
an engine control computer to switch the state of the vehicle from the inactive state to the active state when the second code signal, transmitted by the immobilizing control unit, corresponds to the vehicle code; and
the portable transmitting unit including a control circuit to selectively activate one of said door control computer and said engine control computer, wherein, when the wireless control unit transmits the first code signal to activate the wireless door lock function, transmission of the second code signal by the immobilizing control unit is inhibited, thereby preventing activation of the immobilizing function, and when the immobilizing control unit transmits the second code signal to activate the immobilizing function, transmission of the first code signal by the wireless control unit is inhibited, thereby preventing activation of the wireless door lock function.

11. A vehicle lock apparatus having a wireless door lock function for remotely controlling a locked/unlocked state of a vehicle and an immobilizing function for switching a state of the vehicle between an active state and an inactive state, said vehicle lock apparatus comprising:
a portable wireless transmitting unit having a wireless control unit to transmit a first code signal set in accordance with a first method and an immobilizing control unit to transmit a second code signal set in accordance with a second method;
a door control computer to switch the locked/unlocked state of the vehicle when the first code signal, transmitted by the wireless control unit, corresponds to a vehicle code;
an engine control computer to switch the state of the vehicle from the inactive state to the active state when the second code signal, transmitted by the immobilizing control unit, corresponds to the vehicle code; and
the portable wireless transmitting unit including a control circuit to selectively activate one of said door control computer and said engine control computer, wherein, when one of the wireless door lock function and the immobilizing function is activated by one of the first code signal and the second code signal, the transmission of the other of the first code signal and the second code signal by a corresponding one of the wireless control unit and the immobilizing control unit is inhibited.

12. A vehicle lock apparatus having a wireless door lock function for remotely controlling a locked/unlocked state of a vehicle and an immobilizing function for switching a state of the vehicle between an active state and an inactive state, said vehicle lock apparatus comprising:
a portable transmitting unit having a wireless control unit to transmit a first code signal set in accordance with a first method, an internal power supply to supply a power to said wireless control unit, and an immobilizing control unit to transmit a second code signal set in accordance with a second method;
immobilizing power supply to supply a power to said immobilizing control unit when said portable transmitting unit is in a predetermined close state with respect to the vehicle;

a door control computer to switch the locked/unlocked state of the vehicle when the first code signal, transmitted by the wireless control unit, corresponds to a vehicle code;

an engine control computer to switch the state of the vehicle from the inactive state to the active state when the second code signal, transmitted by the immobilizing control unit, corresponds to the vehicle code; and the portable transmitting unit including a control circuit to inhibit said wireless control unit from transmitting the first code signal when said immobilizing power supply generates a predetermined power, wherein, when the immobilizing function is activated by the second code signal, the control circuit inhibits the transmission of the first code signal by the wireless control unit even if the first code signal is set, and wherein a communication length between said wireless control unit and said door control computer is longer than a length between the portable wireless transmitting unit and the vehicle when said portable transmitting unit is in the predetermined close state with respect to the vehicle.

* * * * *